(12) United States Patent
Plattner

(10) Patent No.: US 7,205,487 B1
(45) Date of Patent: Apr. 17, 2007

(54) METHOD AND APPARATUS FOR ATTACHING CONDUIT TO FLEXIBLE SLEEVING

(75) Inventor: Brad W. Plattner, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 0 days.

(21) Appl. No.: 11/366,337

(22) Filed: Mar. 2, 2006

(51) Int. Cl.
*H02B 1/40* (2006.01)

(52) U.S. Cl. .................. 174/480; 174/481; 174/68.1; 174/68.3; 52/220.1; 52/220.7

(58) Field of Classification Search .................. 174/480, 174/481, 484, 495, 497, 500, 503, 504, 68.1, 174/68.3, 135, 72 A, 72 R, 72 C, 98, 95, 174/96; 439/207, 208, 209, 210, 215; 52/220.1, 52/220.3, 220.7, 239; 220/3.2, 3.3, 3.8, 3.7
See application file for complete search history.

(56) References Cited

U.S. PATENT DOCUMENTS

| 2,453,314 | A | | 11/1948 | Hammerly ................... 174/72 |
|---|---|---|---|---|
| 3,832,672 | A | | 8/1974 | Loos ........................... 339/13 |
| 4,875,871 | A | | 10/1989 | Booty, Sr. et al. .......... 439/209 |
| 5,007,853 | A | | 4/1991 | Olsen ......................... 439/211 |
| 5,013,252 | A | * | 5/1991 | Nienhuis et al. ............ 439/215 |
| 5,041,002 | A | * | 8/1991 | Byrne ......................... 439/215 |
| 5,252,086 | A | * | 10/1993 | Russell et al. .............. 439/215 |
| 5,349,135 | A | * | 9/1994 | Mollenkopf et al. ....... 52/220.7 |
| 5,728,970 | A | * | 3/1998 | Karst et al. ................. 174/497 |
| 6,478,602 | B1 | | 11/2002 | Chapman et al. ........... 439/373 |
| 6,585,537 | B1 | | 7/2003 | Lee ............................. 439/359 |
| 6,652,288 | B2 | * | 11/2003 | Laukhuf et al. ............. 439/215 |
| 6,652,308 | B2 | * | 11/2003 | Chapman et al. ........... 439/215 |
| 6,910,903 | B2 | | 6/2005 | Kondas ....................... 439/215 |
| 6,991,485 | B2 | * | 1/2006 | Plattner et al. ............. 439/215 |
| 7,034,221 | B2 | * | 4/2006 | Johnston et al. ........... 174/68.3 |

* cited by examiner

*Primary Examiner*—Angel R. Estrada
(74) *Attorney, Agent, or Firm*—Taylor & Aust, P.C.

(57) ABSTRACT

An electrical assembly for use with an electrical distribution system used in a modular furniture system. The electrical assembly includes a flexible sleeving with a first sleeving end which has a first cross-section of a first geometrical shape, and a conduit with a first conduit end which has a second cross-section of a second geometrical shape, where the second geometrical shape is different than the first geometrical shape. A coupler is over-molded the first sleeving end and the first conduit end. The coupler includes a first coupler end and a second coupler end, the first coupler end has a first aperture complimentary in shape to the first cross-section, and the second coupler end includes a second aperture complimentary in shape to the second cross-section.

22 Claims, 4 Drawing Sheets

METHOD AND APPARATUS FOR ATTACHING CONDUIT TO FLEXIBLE SLEEVING

BACKGROUND OF THE INVENTION

1. Field of the Invention

The present invention relates to electrical distribution systems used in modular furniture, and, more particularly, to a method and apparatus for attaching conduit to flexible sleeving in an electrical assembly which is part of the electrical distribution system.

2. Description of the Related Art

Jumper cables can be used to electrically interconnect the electrical distribution systems of two modular furniture wall panels, or connect the power mains to an electrical distribution system of a modular furniture wall panel, for example. A jumper cable can include end connectors on either end of the jumper cable, flexible sleeving, and a plurality of electrical conductors enclosed within the flexible sleeving and electrically interconnecting electrical terminals of one end connector to the electrical terminals of the other end connector. The flexible sleeving protects the electrical conductors therewithin, and thereby restricts access to the conductors, which restriction is a safety requirement. However, electrical code requirements can limit the length of the flexible sleeving, thereby limiting the length of the jumper cable, which may not be convenient given the size of the modular wall panels, or the distance of the wall panel to the power mains, for example. That is, the length of the jumper cable can be substantially dictated by the length of the flexible sleeving, because the end connectors are relatively short compared to the length of the flexible sleeving, which sleeving mechanically interconnects the end connectors and encloses the conductors between the end connectors. The needed length of the jumper cable may exceed the allowed length of the flexible sleeving, which therefore requires other protection for the enclosed conductors of the jumper cable, such as rigid or semi-rigid conduit which is not restricted by the electrical code to a certain length. The flexible sleeving typically has a rectangular cross-section, whereas the conduit is typically has an oval or circular cross-section. Further, the flexible sleeving typically is made of plastic, whereas the conduit can be made of plastic or metal, or other materials. There is needed a method and apparatus for joining the flexible sleeving to the conduit to provide a continuity of protected enclosure for the conductors.

Couplings are known which interconnect two circular cross-section conduits of the same diameter; however, these couplings are not suitable for interconnecting a flexible sleeving of a rectangular cross-section to a conduit which has an oval or circular cross-section.

There is known a coupling for raceways used for coupling a thin wall rigid circular conduit and a different type of raceway such as a flexible convoluted circular conduit. The coupling is a tubular member which has a threaded end for attaching to the rigid circular conduit. At the lower end of tubular member there is a split collar that is used for attaching the coupling to the flexible circular conduit. A problem with this coupling is that it requires that the rigid conduit have a threaded end. A further problem with this coupling is that both the rigid conduit and the flexible conduit are required to be of a circular cross-section.

What is needed in the art is a method and apparatus for joining the flexible sleeving of one type of cross-section to rigid or semi-rigid conduit of another type of cross-section.

SUMMARY OF THE INVENTION

The present invention provides a method and apparatus for joining the flexible sleeving of one type of cross-section to rigid or semi-rigid conduit of another type of cross-section The invention comprises, in one form thereof, an electrical assembly for use with an electrical distribution system used in a modular furniture system. The electrical assembly includes a flexible sleeving with a first sleeving end which has a first cross-section of a first geometrical shape, and a conduit with a first conduit end which has a second cross-section of a second geometrical shape, where the second geometrical shape is different than the first geometrical shape. A coupler is over-molded the first sleeving end and the first conduit end. The coupler includes a first coupler end and a second coupler end, the first coupler end has a first aperture complimentary in shape to the first cross-section, and the second coupler end includes a second aperture complimentary in shape to the second cross-section.

The invention comprises, in another form thereof, a modular wall panel assembly which includes a modular wall panel and an electrical assembly connected to the modular wall panel. The electrical assembly includes a flexible sleeving with a first sleeving end which has a first cross-section of a first geometrical shape, and a conduit with a first conduit end which has a second cross-section of a second geometrical shape, where the second geometrical shape is different than the first geometrical shape. A coupler is over-molded the first sleeving end and the first conduit end. The coupler includes a first coupler end and a second coupler end, the first coupler end has a first aperture complimentary in shape to the first cross-section, and the second coupler end includes a second aperture complimentary in shape to the second cross-section.

The invention comprises, in yet another form thereof, a method of connecting a flexible sleeving of one shape to a conduit of another shape, including the steps of: providing a flexible sleeving having a first sleeving end with a first cross-section of a first geometrical shape; providing a conduit having a first conduit end with a second cross-section of a second geometrical shape, the second geometrical shape being different than the first geometrical shape; and over-molding a coupler to the first sleeving end and to the first conduit end, the coupler including a first coupler end and a second coupler end, the first coupler end including a first aperture complimentary in shape to the first cross-section, the second coupler end including a second aperture complimentary in shape to the second cross-section.

An advantage of the present invention is that it mechanically interconnects a flexible sleeving to a rigid or semi-rigid conduit with a different cross-section than the flexible sleeving.

Another advantage of the present invention is that it maintains protection of the enclosed electrical conductors.

Yet another advantage of the present invention is that it extends the length of a jumper cable, for example, while meeting electrical code requirements.

Yet another advantage of the present invention is that it accommodates the generally rectangular cross-section of flexible sleeving and the generally oval or circular (or other) cross-section of the rigid or semi-rigid conduit.

Yet another advantage of the present invention is that it is cost effective to manufacture.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
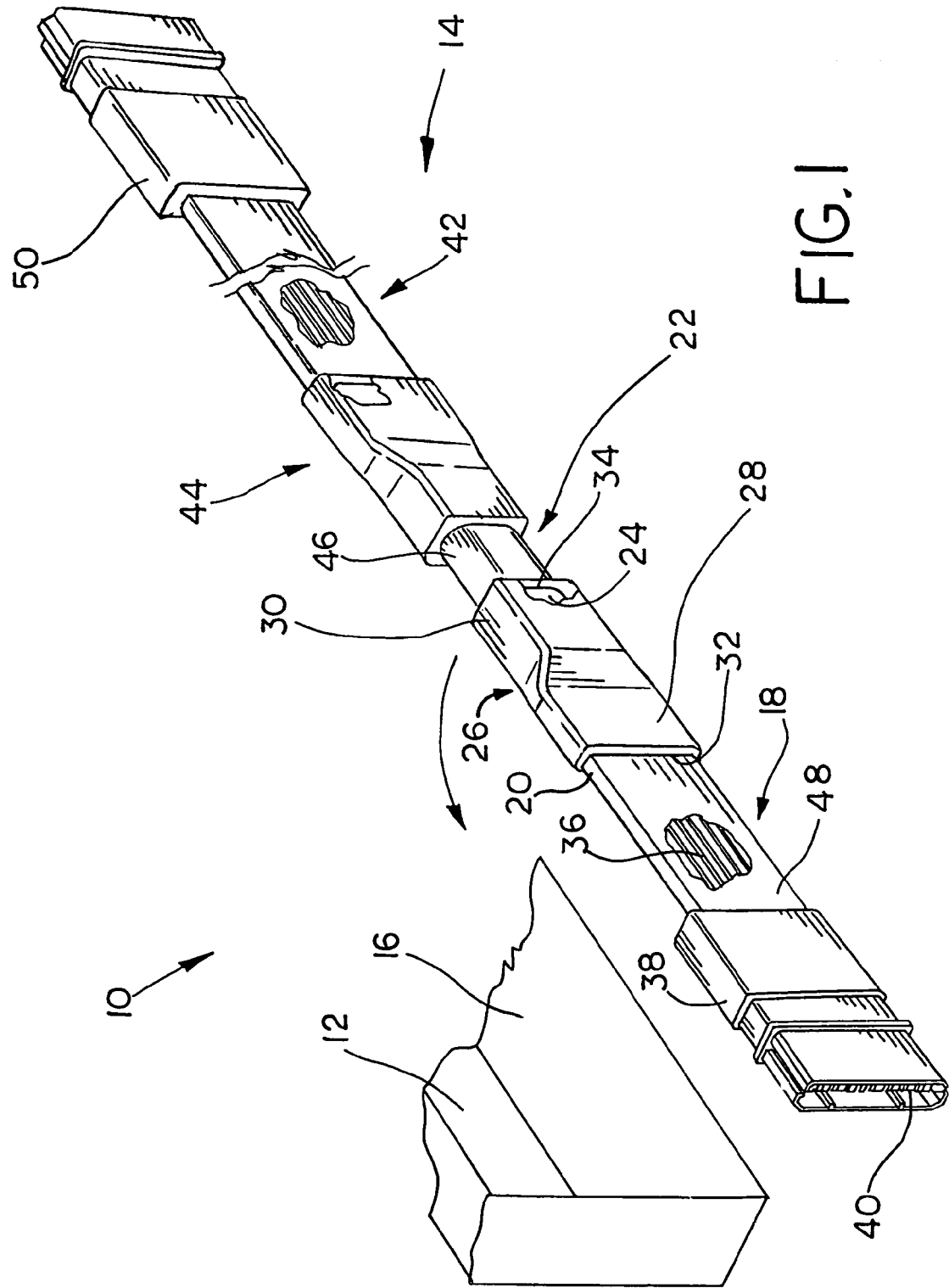
FIG. 1 is fragmentary, exploded perspective view of an embodiment of a modular wall panel assembly including an electrical assembly according to the present invention.

Referring now to the drawings, and more particularly to FIG. 1, there is shown a modular wall panel assembly 10 which generally includes a modular wall panel 12 and an electrical assembly 14 connected to modular wall panel 12. Modular wall panel 12 can include raceway 16 in which electrical assembly 14 is installed.

Electrical assembly 14 can include a flexible sleeving 18 which has a first sleeving end 20 with a first cross-section of a first geometrical shape, a conduit 22 with a first conduit end 24 with a second cross-section of a second geometrical shape, where the second geometrical shape is different than the first geometrical shape. Conduit 22 can be a rigid conduit with an oval cross-section, for example. A coupler 26 is over-molded first sleeving end 20 and first conduit end 24. The molding process can use an insert injection molding process, for example. Coupler 26 includes a first coupler end 28 and a second coupler end 30. First coupler end 28 has a first aperture 32 complimentary in shape to the first cross-section of first sleeving end 20, and second coupler end 30 includes a second aperture 34 complimentary in shape to the second cross-section of first conduit end 24.

First sleeving end 20 extends through first aperture 32 and first conduit end 24 extends through second aperture 34. A plurality of conductors 36 extends through flexible sleeving 18, conduit 22 and coupler 26. A first end connector 38 is connected to flexible sleeving 18, where first end connector 38 has a plurality of electrical terminals 40 connected to respective ones of conductors 36. Electrical assembly 14 can include a second flexible sleeving 42 with a second coupler 44 over-molded second flexible sleeving 42 and a second conduit end 46 of conduit 22. Second coupler 44 can be similar to, or the same as, coupler 26.

Figure 2:
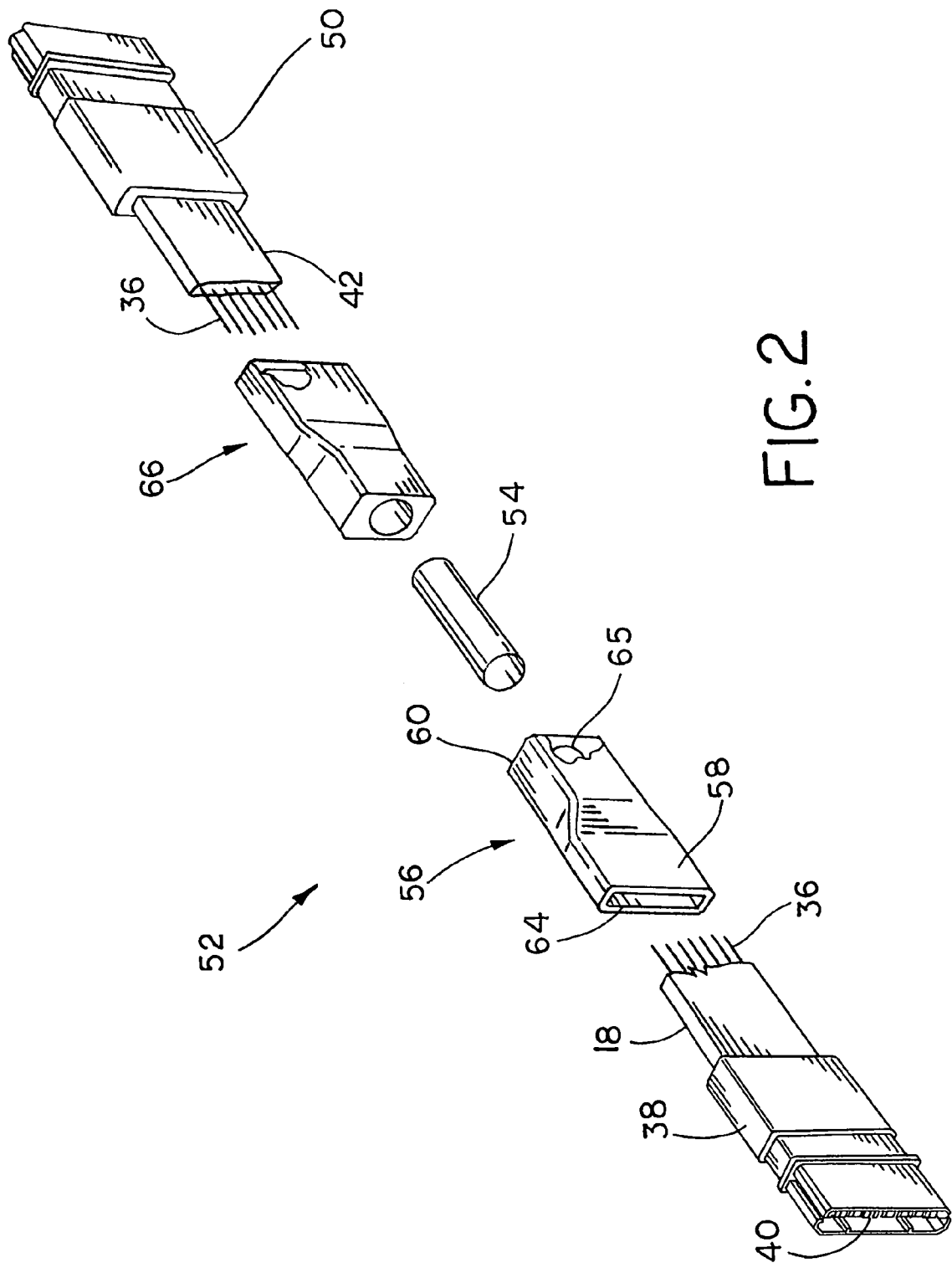
FIG. 2 is fragmentary, exploded perspective view of another embodiment of an electrical assembly according to the present invention.
Figure 3:
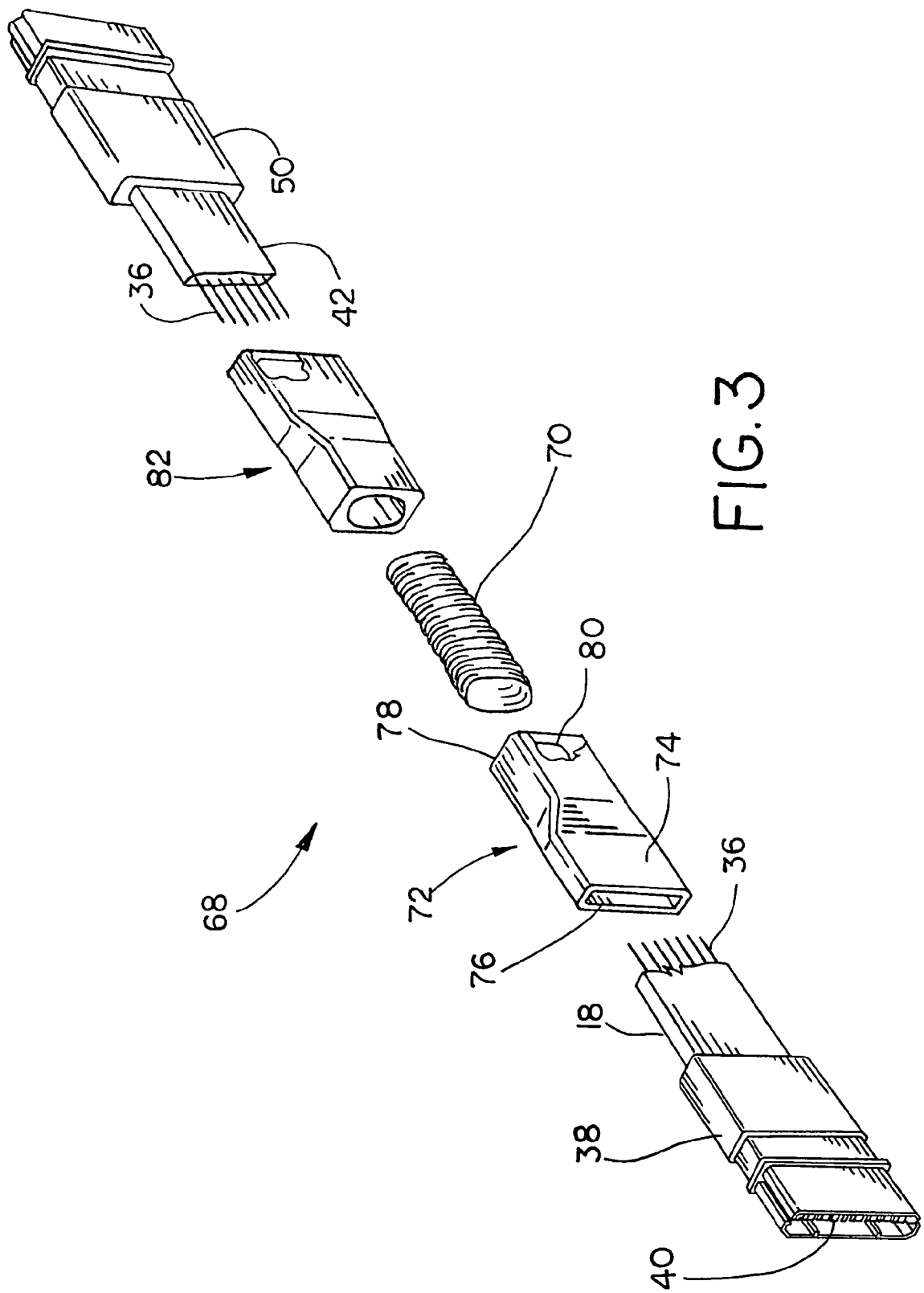
FIG. 3 is fragmentary, exploded perspective view of another embodiment of an electrical assembly according to the present invention.
Figure 4:
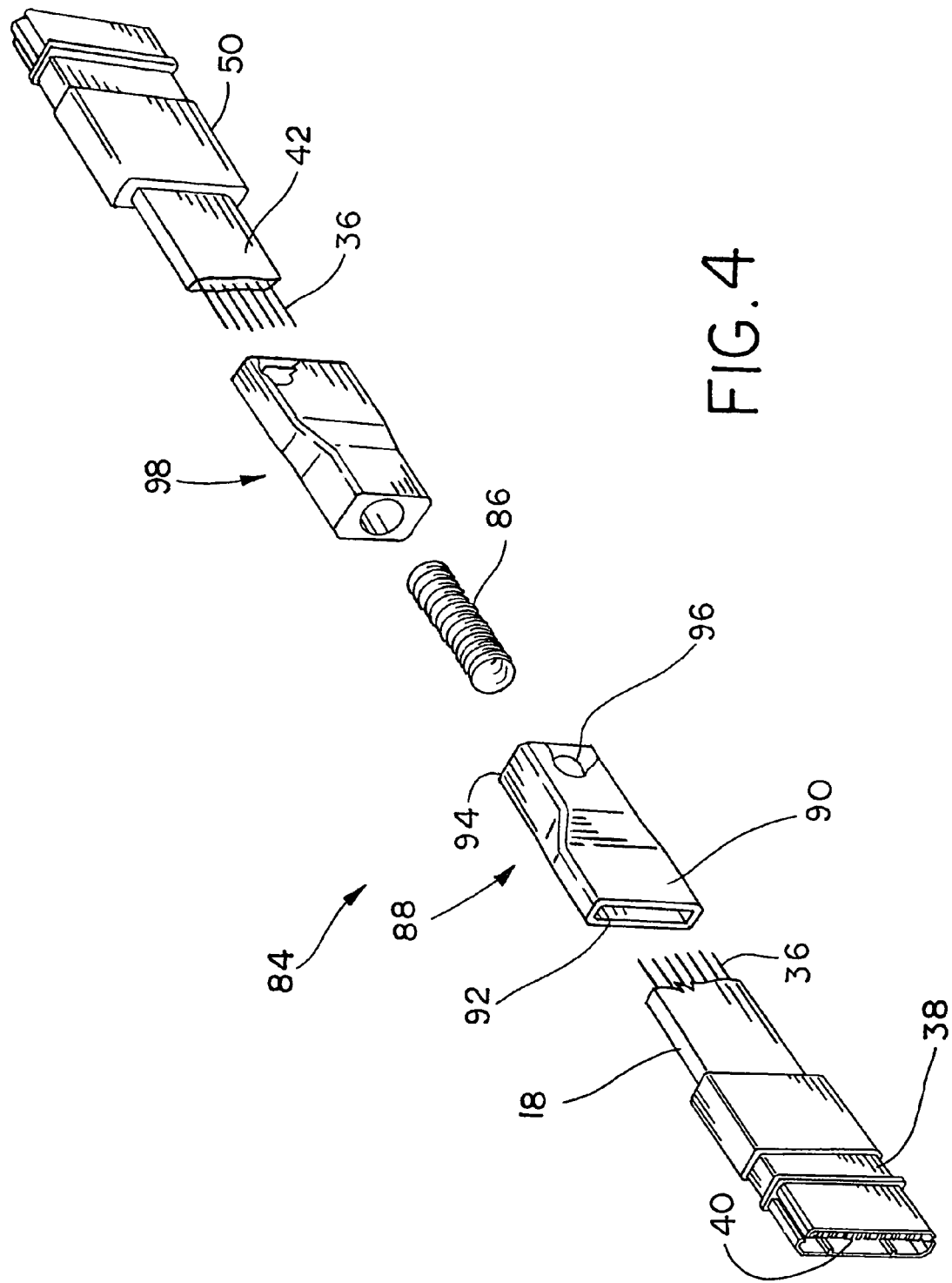
FIG. 4 is fragmentary, exploded perspective view of another embodiment of an electrical assembly according to the present invention.

Flexible sleeving 18 includes a second sleeving end 48, and the first geometrical shape can extend from first sleeving end 20 to second sleeving end 48. Conduit 22 includes second conduit end 46, and the second geometrical shape can extend from first conduit end 24 to second conduit end 46. For example, and as shown in FIG. 1, the first geometrical shape can be rectangular. The second geometrical shape can be oval (FIGS. 1 and 3) or circular (FIGS. 2 and 4). Further, conduit 22 can be a rigid conduit (FIGS. 1 and 2) or a semi-rigid convoluted conduit (FIGS. 3 and 4). Coupler 26 can include a hard plastic, a soft plastic and/or a molding process material. Conductors 36 can electrically connect and extend from terminals 40 of first end connector 38 to corresponding electrical terminals in second end connector 50.

In the embodiment shown in FIG. 2, electrical assembly 52 includes a circular cross-section rigid conduit 54. A first coupler 56 includes a first coupler end 58 with a rectangular first aperture 64 and a second coupler end 60 with a circular second aperture 65. Second coupler 66 is similar to, or the same as, first coupler 56. Electrical assembly 52 is otherwise similar to electrical assembly 14.

In the embodiment shown in FIG. 3, electrical assembly 68 includes an oval cross-section semi-rigid convoluted conduit 70. A first coupler 72 includes a first coupler end 74 with a rectangular first aperture 76 and a second coupler end 78 with an oval second aperture 80. Second coupler 82 is similar to, or the same as, first coupler 72. Electrical assembly 68 is otherwise similar to electrical assembly 14.

In the embodiment shown in FIG. 4, electrical assembly 84 includes a circular cross-section semi-rigid convoluted conduit 86. A first coupler 88 includes a first coupler end 90 with a rectangular first aperture 92 and a second coupler end 94 with a circular second aperture 96. Second coupler 98 is similar to, or the same as, first coupler 88. Electrical assembly 84 is otherwise similar to electrical assembly 14.

In use, the present invention discloses a method of connecting a flexible sleeving of one shape to a conduit of another shape, including the steps of: providing flexible sleeving 18 having first sleeving end 20 with a first cross-section of a first geometrical shape; providing conduit 22 having first conduit end 24 with a second cross-section of a second geometrical shape, the second geometrical shape being different than the first geometrical shape; and over-molding coupler 26 to first sleeving end 20 and to first conduit end 24, coupler 26 including first coupler end 28 and second coupler end 30, first coupler end 28 including first aperture 32 complimentary in shape to the first cross-section, and second coupler end 30 including second aperture 34 complimentary in shape to the second cross-section. The method can further include the steps of extending first sleeving end 20 through first aperture 32; and extending first conduit end 24 through second aperture 34.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical assembly for use with an electrical distribution system used in a modular furniture system, said electrical assembly comprising:

a flexible sleeving having a first sleeving end with a first cross-section of a first geometrical shape;

a conduit having a first conduit end with a second cross-section of a second geometrical shape, said second geometrical shape different than said first geometrical shape; and an imperforate coupler over-molded said first sleeving end and said first conduit end, said coupler including a first coupler end and a second coupler end, said first coupler end including a first aperture complimentary in shape to said first cross-section, said second coupler end including a second aperture complimentary in shape to said second cross-section and connected to said first aperture.

2. The electrical assembly of claim 1, wherein said first sleeving end extends through said first aperture and said first conduit end extends through said second aperture.

3. The electrical assembly of claim 1, further including a plurality of conductors extending through said flexible sleeving, said conduit and said coupler.

4. The electrical assembly of claim 3, further including a first end connector connected to said flexible sleeving, said first end connector having a plurality of terminals connected to respective ones of said plurality of conductors.

5. The electrical assembly of claim 4, further including a second flexible sleeving and a second coupler over-molded said second flexible sleeving and a second conduit end of said conduit.

6. The electrical assembly of claim 1, wherein said flexible sleeving includes a second sleeving end, said first geometrical shape extends from said first sleeving end to said second sleeving end, said conduit includes a second conduit end, said second geometrical shape extends from said first conduit end to said second conduit end.

7. The electrical assembly of claim 1, wherein said first geometrical shape is rectangular.

8. The electrical assembly of claim 7, wherein said second geometrical shape is one of circular and oval.

9. The electrical assembly of claim 8, wherein said conduit is one of a rigid conduit and a semi-rigid convoluted conduit.

10. The electrical assembly of claim 1, wherein coupler includes one of a hard plastic, a soft plastic and a molding process material.

11. A modular wall panel assembly, comprising:
a modular wall panel;
an electrical assembly connected to said modular wall panel, said electrical assembly including:
a flexible sleeving having a first sleeving end with a first cross-section of a first geometrical shape;
a conduit having a first conduit end with a second cross-section of a second geometrical shape, said second geometrical shape different than said first geometrical shape; and
an imperforate coupler over-molded said first sleeving end and said first conduit end, said coupler including a first coupler end and a second coupler end, said first coupler end including a first aperture complimentary in shape to said first cross-section, said second coupler end including a second aperture complimentary in shape to said second cross-section and connected to said first aperture.

12. The modular wall panel assembly of claim 11, wherein said first sleeving end extends through said first aperture and said first conduit end extends through said second aperture.

13. The modular wall panel assembly of claim 11, further including a plurality of conductors extending through said flexible sleeving, said conduit and said coupler.

14. The modular wall panel assembly of claim 13, further including a first end connector connected to said flexible sleeving, said first end connector having a plurality of terminals connected to respective ones of said plurality of conductors.

15. The modular wall panel assembly of claim 14, further including a second flexible sleeving and a second coupler over-molded said second flexible sleeving and a second conduit end of said conduit.

16. The modular wall panel assembly of claim 11, wherein said flexible sleeving includes a second sleeving end, said first geometrical shape extends from said first sleeving end to said second sleeving end, said conduit includes a second conduit end, said second geometrical shape extends from said first conduit end to said second conduit end.

17. The modular wall panel assembly of claim 11, wherein said first geometrical shape is rectangular.

18. The modular wall panel assembly of claim 17, wherein said second geometrical shape is one of circular and oval.

19. The modular wall panel assembly of claim 18, wherein said conduit is one of a rigid conduit and a semi-rigid convoluted conduit.

20. The modular wall panel assembly of claim 11, wherein coupler includes one of a hard plastic, a soft plastic and a molding process material.

21. A method of connecting a flexible sleeving of one shape to a conduit of another shape, comprising the steps of:
providing a flexible sleeving having a first sleeving end with a first cross-section of a first geometrical shape;
providing a conduit having a first conduit end with a second cross-section of a second geometrical shape, said second geometrical shape different than said first geometrical shape; and
over-molding an imperforate coupler to said first sleeving end and to said first conduit end, said coupler including a first coupler end and a second coupler end, said first coupler end including a first aperture complimentary in shape to said first cross-section, said second coupler end including a second aperture complimentary in shape to said second cross-section and connected to said first aperture.

22. The method of claim 21, further including the steps of extending said first sleeving end through said first aperture and extending said first conduit end through said second aperture.

* * * * *